(12) United States Patent
Uhlig et al.

(10) Patent No.: US 8,078,827 B2
(45) Date of Patent: Dec. 13, 2011

(54) METHOD AND APPARATUS FOR CACHING OF PAGE TRANSLATIONS FOR VIRTUAL MACHINES

(75) Inventors: Volkmar Uhlig, New York, NY (US); Leendert van Doorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 11/773,747

(22) Filed: Jul. 5, 2007

(65) Prior Publication Data
US 2009/0013149 A1 Jan. 8, 2009

(51) Int. Cl.
*G06F 12/00* (2006.01)
*G06F 21/00* (2006.01)
*G06F 9/26* (2006.01)
*G06F 9/34* (2006.01)

(52) U.S. Cl. ..... 711/206; 711/6; 711/202; 711/E12.016; 711/E12.059

(58) Field of Classification Search ......... None
See application file for complete search history.

(56) References Cited

U.S. PATENT DOCUMENTS

| | | | |
|---|---|---|---|
| 4,792,897 A | 12/1988 | Gotou et al. | |
| 6,889,296 B2 | 5/2005 | Franaszek et al. | |
| 2002/0082824 A1* | 6/2002 | Neiger et al. | 704/2 |
| 2004/0064668 A1* | 4/2004 | Kjos et al. | 711/202 |
| 2005/0289542 A1 | 12/2005 | Uhlig et al. | |
| 2006/0004944 A1* | 1/2006 | Vij et al. | 711/6 |
| 2006/0174053 A1* | 8/2006 | Anderson et al. | 711/6 |
| 2006/0206658 A1* | 9/2006 | Hendel et al. | 711/6 |
| 2006/0206687 A1* | 9/2006 | Vega | 711/206 |
| 2006/0259732 A1* | 11/2006 | Traut et al. | 711/173 |

* cited by examiner

*Primary Examiner* — Michael Alsip
(74) *Attorney, Agent, or Firm* — F. Chau & Associates, LLC; Daniel P. Morris, Esq.

(57) ABSTRACT

A method for caching of page translations for virtual machines includes managing a number of virtual machines using a guest page table of a guest operating system, which provides a first translation from a guest-virtual memory address to a first guest-physical memory address or an invalid entry, and a host page table of a host operating system, which provides a second translation from the first guest-physical memory address to a host-physical memory address or an invalid entry, and managing a cache page table, wherein the cache page table selectively provides a third translation from the guest-virtual memory address to the host-physical memory address, a second guest-physical memory address or an invalid entry.

7 Claims, 13 Drawing Sheets

METHOD AND APPARATUS FOR CACHING OF PAGE TRANSLATIONS FOR VIRTUAL MACHINES

BACKGROUND OF THE INVENTION

1. Field of the Invention

The present disclosure relates to virtual memory and, more particularly, to a method and apparatus for caching of page translations for virtual machines.

2. Description of Related Art

An operating system is a set of computer programs that manage the hardware and software resources of a computer. Operating systems present to software applications the abstraction of virtual memory. The term virtual memory refers to a technique by which the physical memory of a computer, usually referred to as main memory, is not directly addressed, but is instead accessed via virtual addresses (logical addresses). This is achieved by placing the contents of the virtual memory on an auxiliary storage device and bringing parts of it into main memory, as required by an application, in a way that is transparent to the application. Virtual memory can be realized as page tables that store the translation from virtual addresses to physical addresses, wherein the translation function itself is processor platform dependent. Processors commonly cache the translation result in a translation look-aside buffer (TLB), which is a processor internal cache that is used to improve the speed of virtual address translation.

Hardware virtualization, commonly referred to as virtual machines, provides the illusion of one or more real machines to an operating system while providing access to virtual hardware resources. These include memory, processors and input/output (I/O) devices. Hardware virtualization can be realized using a virtual machine monitor (VMM) that presents to other software the abstraction of one or more virtual machines. The VMM is a software layer, which runs directly above the host hardware. The VMM contains emulation code that models the hardware behavior and further controls access to the actual resources of the real machine.

Virtualization of physical memory can be implemented by allocating and mapping parts of the machine's physical resources to a virtual machine (VM). The VM's guest operating system (guest OS), in turn, further partitions the memory between applications, data and the internal operations of the guest OS. This virtualization layer introduces a second translation layer for application memory allocated by the guest OS. The guest OS maintains page tables that translate from the application's virtual address space to the guest OS's physical address space. Additionally, the VMM translates from the OS's virtualized physical address space ("guest" physical addresses) to the machine's resources (host physical addresses). Hence, virtualization of memory requires two address translations: from guest-virtual to guest-physical memory and then from guest-physical to host-physical memory. For multi-level page tables each entry in a guest page table needs to be translated from guest-physical to host-physical addresses, effectively nesting a guest-physical to host-physical translation for each level in the table lookup.

Without requiring special hardware support, VMMs may be employed to generate and maintain an extra set of page tables, also referred to as shadow page tables, which translate guest virtual addresses into the host's physical addresses. These shadow page tables are derived from the guest OS's page tables and the VMM's resource allocation. However, the software model has a performance overhead due to the need for the VMM to maintain consistency between the real and the shadow page tables. This overhead is incurred by using status bits, such as accessed and dirty bits, which are co-located in the page tables. A number of software algorithms have been derived to minimize the overhead.

To achieve the nested translation without software intervention, it was proposed that virtualization-enhanced processors could perform the address translations. Such a model was proposed in the AMD (Advanced Micro Devices Inc.) "Pacifica" specification of its virtualization technology. In this approach, the VMM specifies a second memory address translation table that contains translations from guest-physical to host-physical memory. On a "TLB miss", i.e., when memory is accessed and the mapping is currently not present in the TLB, the processor translates the guest-OS virtual address into a guest-physical address and after that, translates the guest-physical memory address into a host-physical memory address using the second translation table of the VMM.

In order to minimize memory footprint, page tables are structured in a hierarchy. As a result of the hierarchical structure, an address lookup has to perform multiple lookups until the translation is complete. That is, each lookup returns the address of the next level in the page table hierarchy until the translation is completed (or fails). In a non-virtualized environment, the references to the next level in the page table hierarchy are specified as physical addresses. When virtualizing a machine, the page table entries reference guest-physical memory. For a lookup, the processor has to translate the guest-physical memory address into a host-physical memory address before it can read the actual value. Thus the total number of required memory lookups depends on the number of levels of the guest-OS page tables and the VMM's page tables, which is the product of the guest-OS levels and host-OS levels.

With increasing virtual address spaces and supported physical memory, the number of levels of page tables increases. For example, when the OS page tables and the VMM page tables contain four levels, a page table lookup requires a total of sixteen memory references. In further virtualization extensions, this number grows quadratic with increasing virtualization layers.

There is a need for methods and apparatus for optimized address translations using nested multi-level page tables.

SUMMARY OF THE INVENTION

According to an exemplary embodiment of the present invention, a method for caching of page translations for virtual machines includes managing a number of virtual machines using a guest page table of a guest operating system, which provides a first translation from a guest-virtual memory address to a first guest-physical memory address or an invalid entry, and a host page table of a host operating system, which provides a second translation from the first guest-physical memory address to a host-physical memory address or an invalid entry; and managing a cache page table, wherein the cache page table selectively provides a third translation from the guest-virtual memory address to the host-physical memory address, a second guest-physical memory address or an invalid entry.

According to an exemplary embodiment of the present invention, a computer system includes a memory system for storing a program code and data including a guest page table, a host page table and a cache page table, and a processor in communication with the memory system, wherein the processor executes the program code to implement a virtual machine monitor (VMM), wherein the VMM manages the cache page table and the host page table; wherein the processor translates a guest-virtual memory address to a host-physical memory address using the cache page table, which translates directly from the guest-virtual memory address to the host-physical memory address or translates indirectly by reading one or more entries from a guest page table or a processor register and translating each read entry, if valid, from guest-physical memory to host-physical memory using the host page table.

According to an exemplary embodiment of the present invention, a method of translating virtual-memory addresses to physical-memory addresses in a computer system serving as a platform for execution of a virtual machine monitor includes managing a number of virtual machines using a guest page table of a guest operating system to translate from a guest-virtual memory address to a first guest-physical memory address or an invalid entry, and using a host page table of a host operating system to translate from the first guest-physical memory address to a host-physical memory address or an invalid entry, using at least one status update bit in a cache page table to denote whether a status bit in the guest page table needs to be updated; and using the cache page table to translate guest-virtual memory addresses, within a virtual-address-space partition allocated by a virtual machine monitor to the guest operating system, to host-physical memory addresses.

According to an exemplary embodiment of the present invention, a method of translating virtual-memory addresses to physical-memory addresses in a computer system serving as a platform for execution of a virtual machine monitor includes managing a number of virtual machines using a guest page table of a guest operating system, which provides a first translation from a guest-virtual memory address to a first guest-physical memory address or an invalid entry, and a host page table of a host operating system, which provides a second translation from the first guest-physical memory address to a host-physical memory address or an invalid entry, and managing a cache page table, wherein the cache page table selectively provides a third translation from the guest-virtual memory address to the host-physical memory address, a second guest-physical memory address or an invalid entry.

The present invention will become readily apparent to those of ordinary skill in the art when descriptions of exemplary embodiments thereof are read with reference to the accompanying drawings.

DESCRIPTION OF EXEMPLARY EMBODIMENTS

Hereinafter, exemplary embodiments of the present invention will be described with reference to the accompanying drawings. It is to be understood that exemplary embodiments of the present invention described herein may be implemented in various forms of hardware, software, firmware, special purpose processors, or a combination thereof. An exemplary embodiment of the present invention may take the form of an entirely hardware embodiment, an entirely software embodiment or an embodiment containing both hardware and software elements. An exemplary embodiment may be implemented in software as an application program tangibly embodied on one or more program storage devices, such as for example, computer hard disk drives, CD-ROM (compact disk-read only memory) drives and removable media such as CODs, DVDs (digital versatile discs or digital video discs). Universal Serial Bus (USB) drives, floppy disks, diskettes and tapes, readable by a machine capable of executing the program of instructions, such as a computer. The application program may be uploaded to, and executed by, an instruction execution system, apparatus or device comprising any suitable architecture. It is to be further understood that since exemplary embodiments of the present invention depicted in the accompanying drawing figures may be implemented in software, the actual connections between the system components (or the flow of the process steps) may differ depending upon the manner in which the application is programmed.

Figure 1:
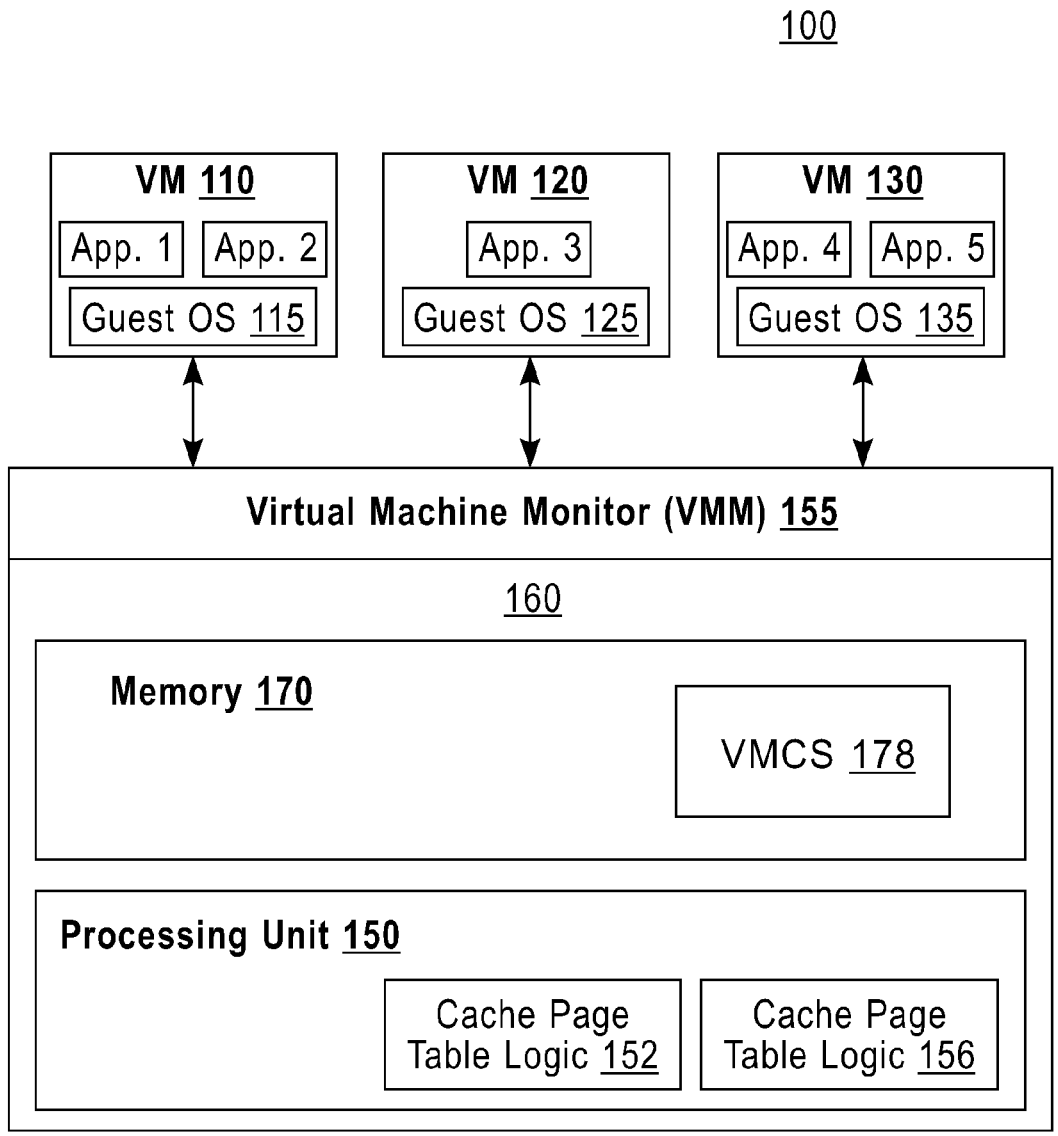
FIG. 1 is a block diagram illustrating a virtual-machine environment in which an exemplary embodiment of the present invention may be implemented.

FIG. 1 is a block diagram illustrating a virtual-machine environment in which an exemplary embodiment of the present invention may be implemented. Referring to FIG. 1, a virtual-machine environment 100 includes platform hardware 160, which comprises a computing platform. The platform hardware 160 is not specific to any one processor or operating system. The platform hardware 160 may be capable of running a standard operating system (OS) or a virtual machine monitor (VMM) 155, for example.

A VMM 155 may be implemented in software, for example, as a standalone program and/or a component of a host operating system, hardware, firmware and/or any combination thereof. A VMM 155 may emulate and export a hardware interface to software, such as for example, a standard or real-time OS.

The platform hardware 160 can be a personal computer (PC), mainframe, handheld device, portable computer, set-top box, or any other computing system. The platform hardware 160 includes a processing unit 150, memory 170 and cache page table logic 172.

Processing unit 150 may include one or more processors or CPUs. Processing unit 150 may include any type of processor capable of executing software, such as a microprocessor, digital signal processor, microcontroller, or the like. The processing unit 150 may include microcode, reconfigurable logic, programmable logic or hardcoded logic for performing the execution of method embodiments of the present invention. Processes of embodiments of the present invention may be applied to a multiprocessor data processing system.

Memory 170 can be a hard disk, a floppy disk, random access memory (RAM), read only memory (ROM), flash memory, any combination of the above devices, or any other type of machine medium readable by the processing unit 150. Memory 170 may store one or more programs of instructions and/or data.

The VMM 155 presents to other software (e.g., "guest" software) the abstraction of one or more virtual machines (VMs), which may provide the same or different abstractions to the various guests. Processes of embodiments of the present invention may be applied to one or more VMs. For example, FIG. 1 shows three VMs, 110, 120 and 130. The guest software running on each VM may include a guest OS, such as a guest OS 115, 125 or 135 and various guest software applications 15. Guest software applications 1 and 2 running in the VM 110, guest software application 3 running in the VM 120 and guest software applications 4 and 5 running in the VM 120 all expect to access physical resources (e.g., processor registers, memory and I/O devices) within the VMs 110, 120 and 130 on which the respective guest software applications 1-5 are running and to handle various events including interrupts generated by system devices, exceptions, and the like. In a virtual-machine environment, the VMM 155 should be capable of exercising control over the physical resources to provide proper operation of VMs 110, 120 and 130 and protection from and between VMs 110, 120 and 130. The VMM 155 may realize such control by intercepting accesses of the guest software to the computer's physical resources as necessary.

Guest software may access resources that are classified as "privileged" or "non-privileged." In the case of privileged resources, the VMM 155 facilitates functionality desired by guest software while retaining ultimate control over the privileged resources. Non-privileged resources do not need to be controlled by the VMM 155 and can be accessed by guest software.

Each guest OS 115, 125 and 135 expects to handle various fault events such as hardware and software interrupts, exceptions, such as for example, page faults, general protection faults, traps, aborts, etc., and platform events, such as for example, initialization and system management interrupts.

In an exemplary embodiment of the present invention, the processing unit 150 controls the operation of the VMs 110, 120 and 130 in accordance with data stored in a VM control structure (VMCS) 178. For example: as shown in FIG. 1, the VMCS 178 may be stored in memory 170. The VMCS 178 may be stored in the processing unit 150. Multiple VMCS structures may be used to support multiple VMS.

The VMCS 178 is a structure that may contain the state of guest software, the state of the VMM 155, execution control information indicating how the VMM 155 wishes to limit or otherwise control operation of guest software and other information.

In an exemplary embodiment of the present invention, a cache page table structure that combines software and hardware models for page table virtualization caches the translation from guest-virtual memory addresses to host-physical memory addresses.

In an exemplary embodiment of the present invention, the cache page table structure includes a type identifier per page table pointer. The type identifier denotes whether the page-table pointer refers to a guest-physical memory address or a host-physical memory address.

For guest-physical memory addresses, the processor performs an additional page translation from guest-physical addresses to host-physical addresses using a host page table. For a host-physical memory address, according to an exemplary embodiment of the present invention, the processor skips the additional page translation and uses the value as is. This scheme, which is transparent to the VM, allows for incremental optimization from the root towards the leaf page tables, and it decreases the number of required memory accesses by the number of levels in the cache page table.

In an exemplary embodiment of the present invention, an address translation involves three page tables: a guest-virtual to guest-physical page table, a guest-physical to host-physical page table, and a guest-virtual to host-physical page table (referred to herein as a "cache page table"). Each of the three page tables has a page-table root pointer.

IA-32 (an abbreviation for Intel Architecture, 32-bit) stores the page table root pointer in a special processor register called CR3. AMD's Pacifica extension defines two page table root pointers: gCR3 and hCR3, for guest and host page tables, respectively. In an exemplary embodiment of the present invention, a cache page table pointer is associated with each virtual machine control structure.

In an exemplary embodiment of the present invention, upon a TLB miss, the processing unit performs a page table lookup in the cache page table. Depending on the type identifier in the page table entry, the address stored in the page table is either considered a guest-physical memory address or a host-physical memory address. For host-physical addresses, the processing unit does not perform an additional address translation from guest-physical to host-physical addresses, but continues the normal lookup. In the case where the page table entry is tagged as guest physical, the processing unit performs a second translation using the guest-physical to host-physical page table.

The structure of the cache page table may be independent of the guest and host page tables. Cache page table entries may have different size, layout and/or bits than the guest and host page tables. In an exemplary embodiment of the present invention, cache page table caches two translations: the guest virtual to guest physical translation and the guest physical to host physical translation. The cache page table may contain at least one bit that denotes if the address stored in the entry denotes a guest-physical memory address or a host-physical memory address.

In an exemplary embodiment of the present invention, a page table type identifier is added for the cache page table root pointer, for example, to support direct translation from guest-virtual to host-physical addresses, and to perform a nested lookup from guest-virtual to guest-physical followed by a guest-physical to host-physical translation.

Figure 2A:
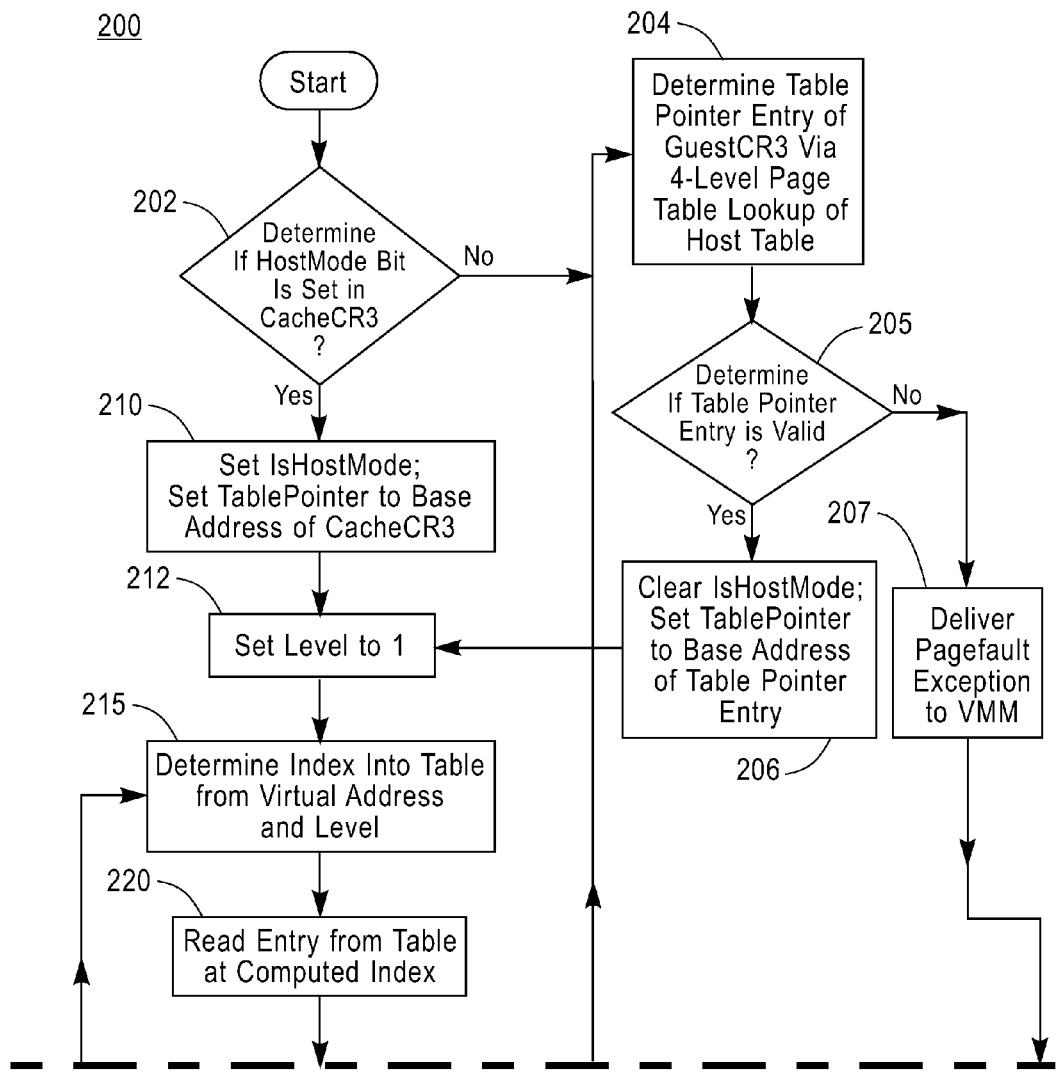
FIG. 2 is a flowchart illustrating a method for caching of page translations for virtual machines, according to an exemplary embodiment of the present invention.
Figure 2B:
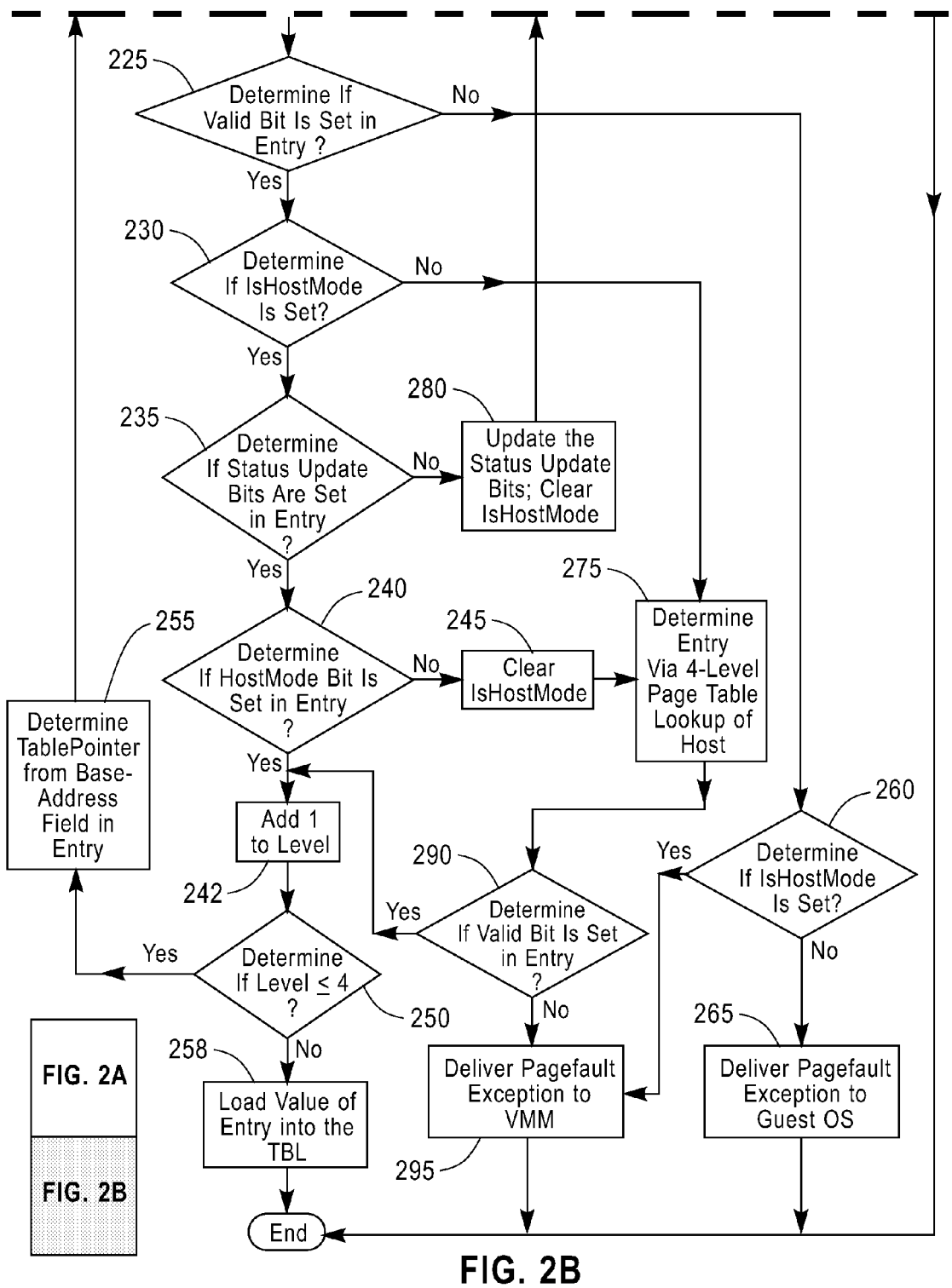

FIG. 2 is a flowchart illustrating a method 200 for caching of page translations for virtual machines, according to an exemplary embodiment of the present invention. Referring to FIG. 2, upon a TLB miss, when it is determined in step 202 that the Hostmode bit is set in CacheCR3, then set IsHostMode and set TablePointer to Base Address of CacheCR3, in step 210. Otherwise, in the case where the Hostmode bit is not set in CacheCR3, determine the page table pointer entry by performing a page table translation via a 4-level page table lookup using the host page table, in step 204. Hereinafter, IsHostMode serves as a state identifier for the method 200.

When it is determined, in step 205, that the page table pointer entry is valid, then clear IsHostMode and set the TablePointer to the base address of the page table pointer entry, in step 206. Otherwise, in the case where the page table pointer entry is not valid, deliver a page fault exception to the VMM, in step 207.

In step 212, a level counter for the page table (referred to herein as "Level") is set to 1. In an exemplary embodiment of the present invention described in connection with FIG. 2, the example translation is 4-level page table. However, it is to be understood that processes of exemplary embodiments of the present invention can involve any number of levels of the page tables or levels of nesting.

Figure 3:
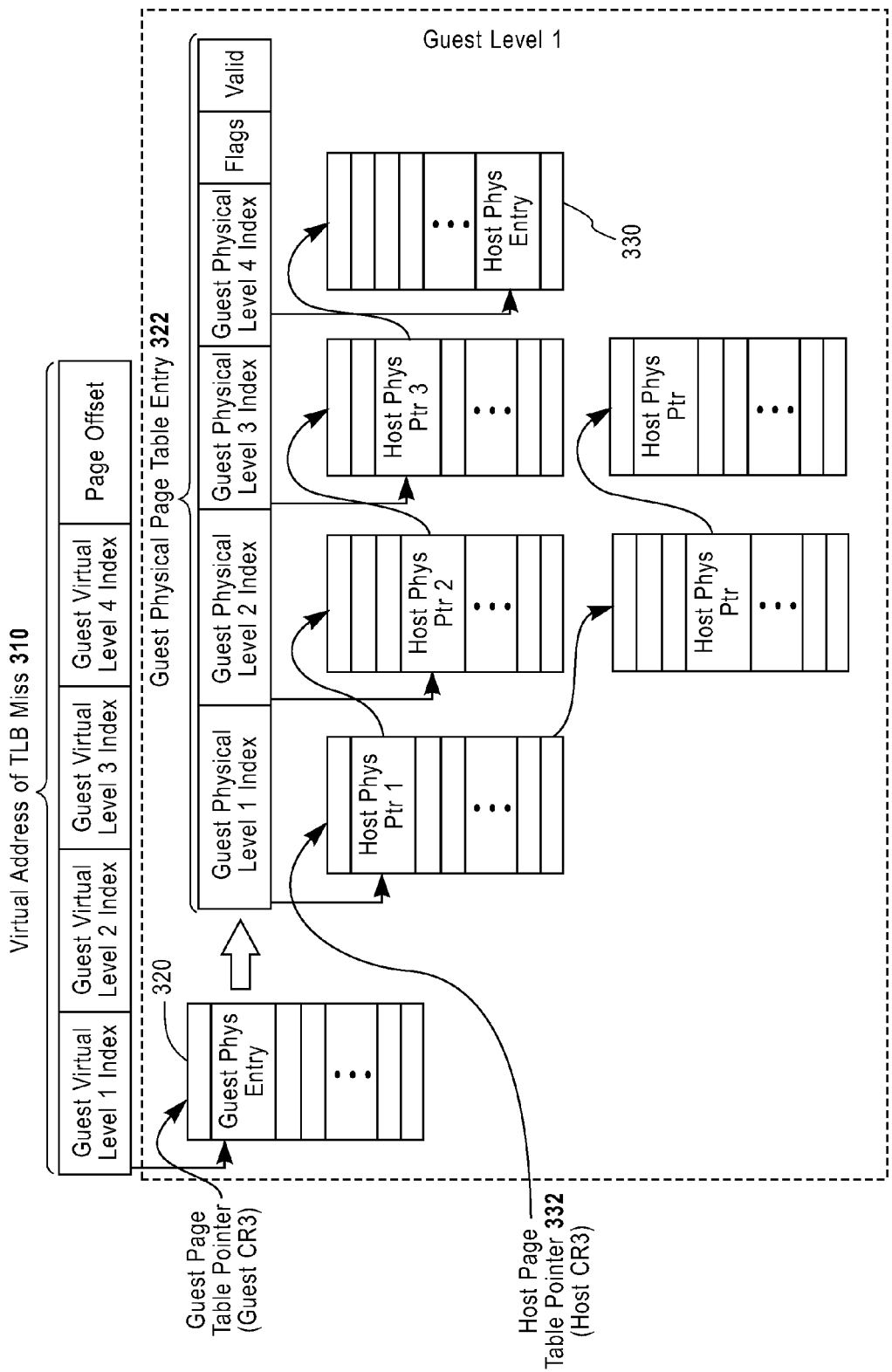
FIG. 3 is a diagram illustrating an example of an address translation for one level using a conventional nested page table walk.

In step 215, the index into the page table that is stored in Table Pointer is determined from the TLB miss address and Level. An example of a virtual address of a TLB miss 310 is depicted in FIG. 3. Based upon the index determined in step 215, the page table entry (referred to herein as "Entry") from the page table referenced by Table Pointer is read, in step 220.

When it is determined, in step 225, that the valid bit is set in Entry, then determine if IsHostMode is set, in step 230. Otherwise, in the case where the valid bit is not set in Entry, determine IsHostMode is set, in step 260.

When it is determined, in step 230, that IsHostMode is not set, the base address of Entry is translated via a 4-level page table lookup of host, in step 275. Otherwise, in the case where IsHostMode is set, determine if the one or more status update bits are set in the Entry, in step 235. In an exemplary embodiment of the present invention, the status update bits comprise accessed and dirty bits.

When it is determined, in step 235, that the one or more status update bits are not set (e.g., the accessed bit is not set and the dirty bit is not set), and the access method is a write access, then, in step 280, perform the following: update the guest page tables with the corresponding status update bit(s); update the status update bit(s) in the Cache Page Table; clear IsHostMode; and then go to step 204. Otherwise, in the case where the one or more status update bits are set (e.g., the accessed bit is set and the dirty bit is set), determine if the hostmode bit is set in Entry, in step 240.

When it is determined, in step 240, that the hostmode bit is set in the Entry, then clear IsHostMode, in step 245. Otherwise, in the case where the hostmode bit is not sets Level is increased by 1, in step 242.

When it is determined, in step 250, that Level is less than or equal to 4 (in this example), then, in step 255, Table Pointer is updated to the base address field of Entry, after which, return to step 215. Otherwise, in the case where Level is greater than 4, the value of Entry is loaded into the TLB, in step 258.

When it is determined, in step 260, that IsHostMode is set, then deliver page fault exception to VMM, in step 295. Otherwise, in the case where the IsHostMode is not set, deliver page fault exception to guest OS, in step 265.

When it is determined, in step 290, that the valid bit of Entry is set, then Level is increased by 1 in step 242. Otherwise, in the case where the valid bit of the Entry is not set, deliver a page fault exception to the hypervisor, in step 295.

Processes of an exemplary embodiment of the present invention described in connection with FIG. 2 may involve superpages, as will be described later in this disclosure. Processes of an exemplary embodiment of the present invention may update the status bit(s) (e.g., accessed and dirty bits) for a subset of the levels, such as only level 3 and 4. It is to be understood that the hostmode bit, CacheCR3, and status bits can be implemented in various ways.

FIG. 3 is a diagram illustrating an example of an address translation for one level using a conventional nested page table walk. FIG. 3 depicts one out of multiple translations of a guest page table entry of a guest operating system to a host-physical address using a host page table. The virtual address of a TLB miss 310 is partitioned into a number of index fields (in this example, 4 index fields) and a page offset. The processing unit reads the guest page table entry 320 using the already translated guest page table pointer as a base address to the table and the level 1 index. In this example, the guest physical page table entry 322 is partitioned into four index fields, multiple flags, and a valid bit (see FIG. 7).

The guest physical address is then translated via the host page table 330. In an exemplary embodiment of the present invention, a host page table pointer (HostCR3) 332 denotes the beginning of the host page table. For levels 1 to 3, each table of the host page table 330 may reference one or more tables, or contain entries marked invalid. Pages in the fourth level of the page table may reference one or more host pages or contain entries marked invalid.

Figure 4:
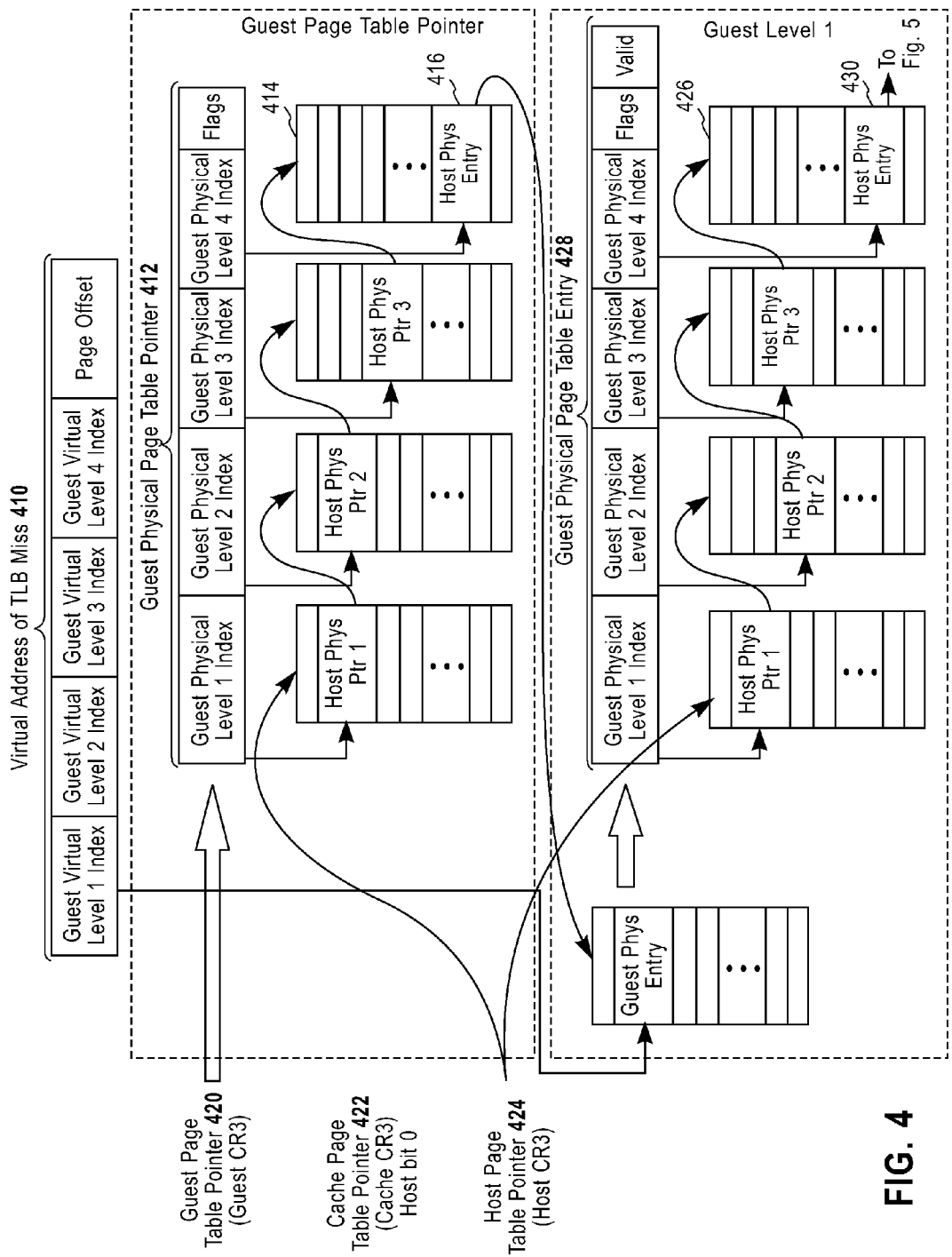
FIG. 4 is a diagram illustrating an example of an address translation of the guest page table root pointer and the first level of a guest page table, according to an exemplary embodiment of the present invention.

FIG. 4 is a diagram illustrating an example of an address translation of the guest page table root pointer and the first level of a guest page table, according to an exemplary embodiment of the present invention. Referring to FIG. 4, the virtual address of a TLB miss 410 is partitioned into a number of index fields (in this example, 4 index fields) and a page offset. It will be appreciated that a virtual address of a TLB miss can be partitioned into any number of index fields.

In the example illustrated in FIG. 4, when the cache page table pointer 422 has a clear host bit, the guest page table pointer 420 is used as the page table base address. The processing unit first translates the guest page table pointer 420 to a host-physical pointer using the host page table 414 referenced by the host page table pointer 424. The translation may be performed by a normal page table lookup. For example, such a page table lookup may involve partitioning the guest page table pointer into four index fields and flags and looking up the individual table entries of the multi-level page table. The processing unit then indexes into the guest page table using the host-physical pointer and reads a guest-physical entry 428.

The guest physical entry is partitioned into four index fields, flags and a valid bit and translated into a guest-physical address using the host page table 426. The base address of the host-physical entry 430 read from the host page table provides the host-physical start address of the second level guest page table in FIG. 5, 430.

Figure 5:
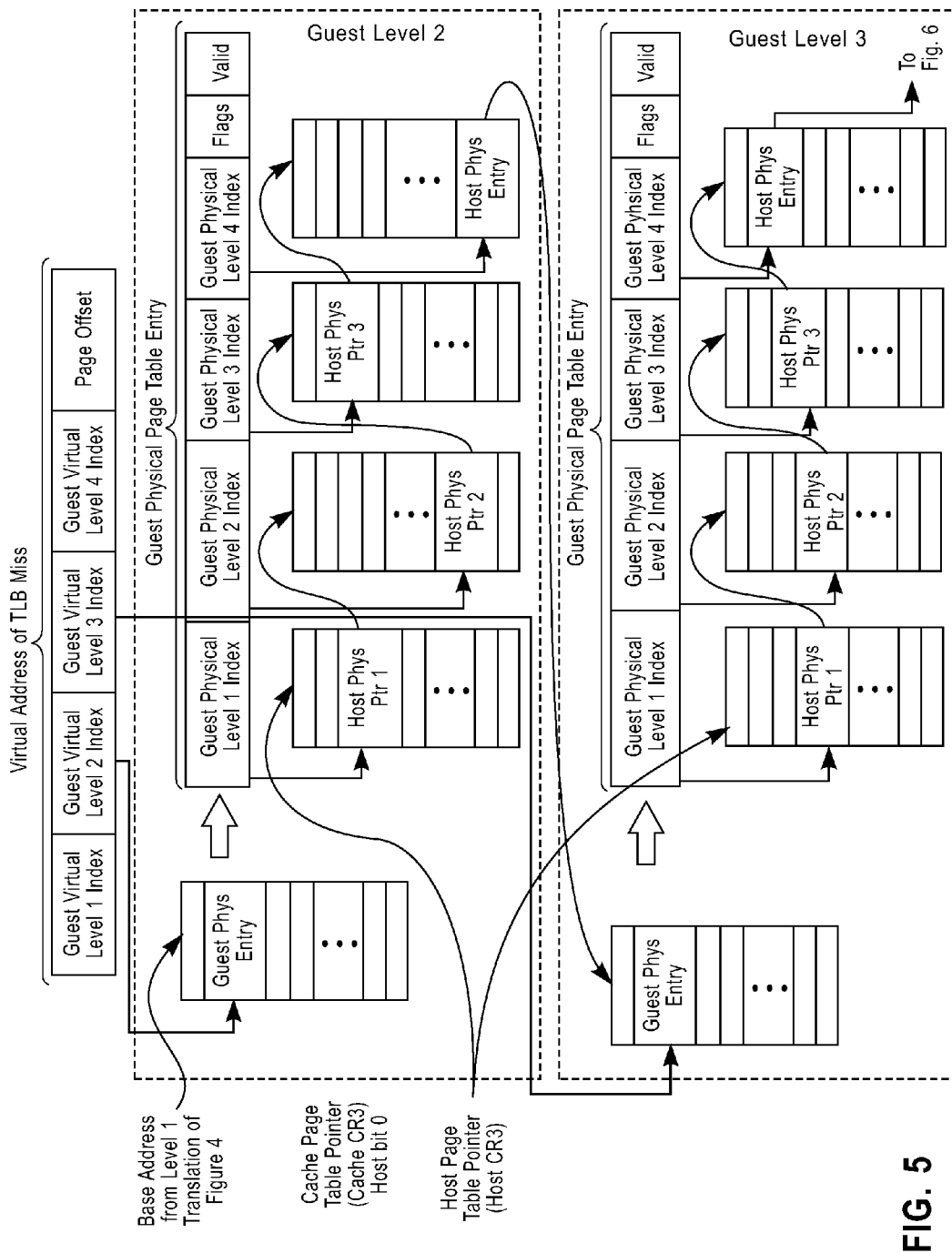
FIG. 5 is a diagram illustrating an example of an address translation of the second and third levels of a guest page table, according to an exemplary embodiment of the present invention.

FIG. 5 is a diagram illustrating an example of an address translation of the second and third levels of a guest page table, according to an exemplary embodiment of the present invention. The second and third level page table translations may be performed substantially the same as the first level page table translation shown in FIG. 4, and further description thereof will be omitted in the interests of clarity and simplicity.

Figure 6:
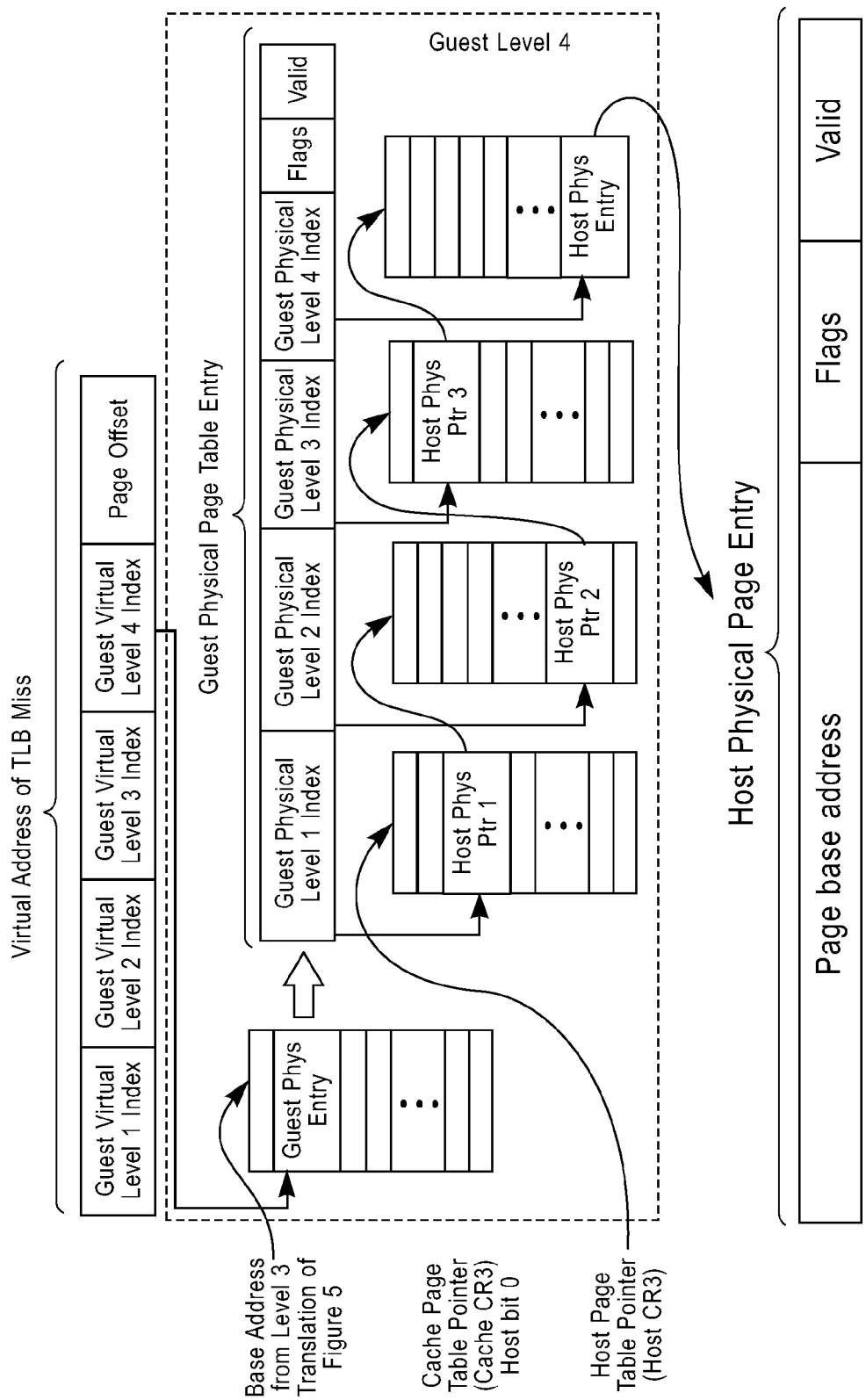
FIG. 6 is a diagram illustrating an example of an address translation of the fourth level of a guest page table, according to an exemplary embodiment of the present invention.

FIG. 6 is a diagram illustrating an example of an address translation of the fourth level of a guest page table, according to an exemplary embodiment of the present invention. The fourth level page table translations may be performed substantially the same as the first level page table translation shown in FIG. 4, and further description thereof will be omitted.

Figure 7:
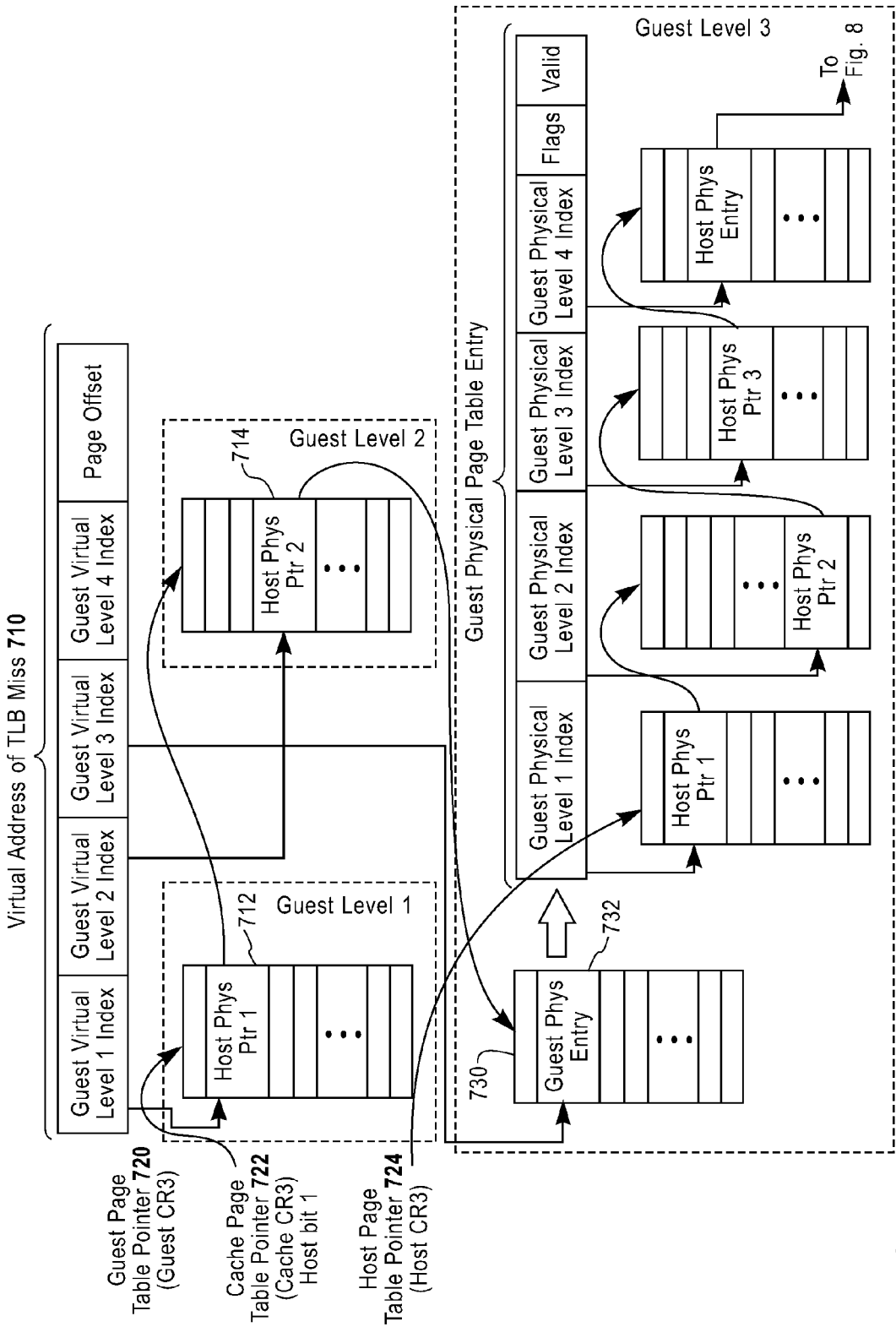
FIG. 7 is a diagram illustrating an example of an address translation of a cache page table, according to an exemplary embodiment of the present invention.

FIG. 7 is a diagram illustrating an example of an address translation of a cache page table according to an exemplary embodiment of the present invention. Referring to FIG. 7, the first three translations are performed from guest-virtual addresses to host-physical addresses according to the set host bit in CacheCR3 722, and the first two page table entries 712 and 714.

In this example, the entry 732 in the third page table 730 has the host bit cleared and thus references a guest physical page table. The guest physical entry is translated via the host page table referenced by HostCR3 724.

Figure 8:
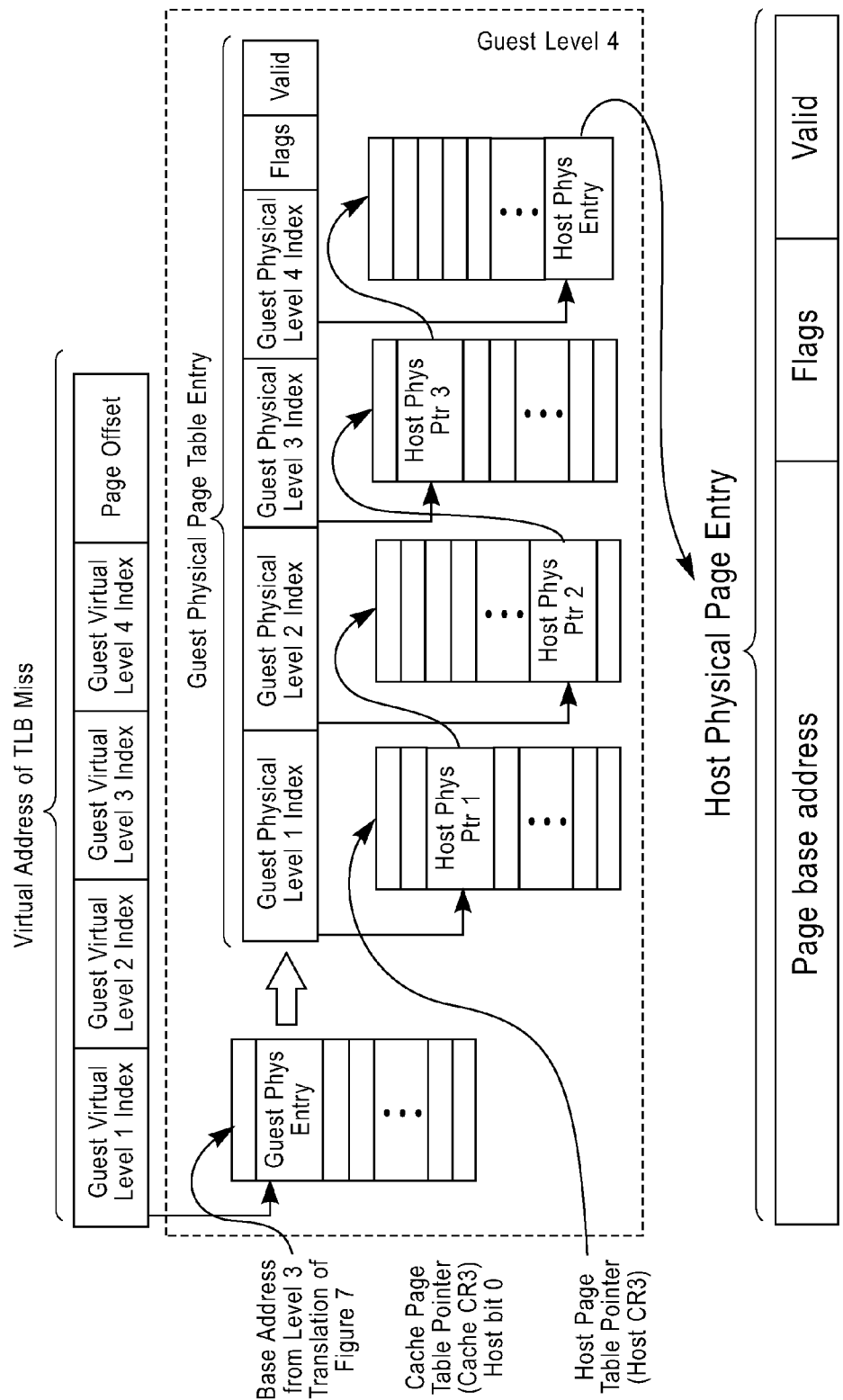
FIG. 8 is a diagram illustrating an example of an address translation of the fourth level of a guest page table, according to an exemplary embodiment of the present invention.

FIG. 8 is a diagram illustrating an example of an address translation of the fourth level of a guest page table, according to an exemplary embodiment of the present invention. The fourth level page table translations may be performed substantially the same as the first level page table translation shown in FIG. 4.

In exemplary embodiment of the present invention, a method for caching of page translations for virtual machines includes managing a number of virtual machines, using a guest page table of a guest operating system and a host page table of a host operating system, and managing a cache page table. A guest page table of the guest operating system provides a first translation from a guest-virtual memory address to a first guest-physical memory address or an invalid entry. A host page table of the host operating system provides a second translation from the first guest-physical memory address to a host-physical memory address or an invalid entry.

A cache page table, according to an exemplary embodiment of the present invention, selectively provides a third translation from the guest-virtual memory address to the host-physical memory address a second guest-physical memory address or an invalid entry. For example, the third translation may be a direct translation from the guest-virtual memory address to the host-physical memory address or an invalid entry or an indirect translation using the guest page table and the host page table. An indirect translation may include reading one or more entries from a guest page table or a processor registers and translating each entry if valid, from guest physical memory to host physical memory using the host page table, or if not valid, an exception is raised.

A cache page table may be realized using a cache page table pointer to point to the start of the page table, wherein the cache page table pointer includes a host bit in exemplary embodiment of the present invention the cache page table contains at least one cache page table entry and each cache page table entry includes a host bit. For example, the host bit may denote if the address stored in an entry denotes a guest-physical memory or a host-physical memory address.

Figure 9:
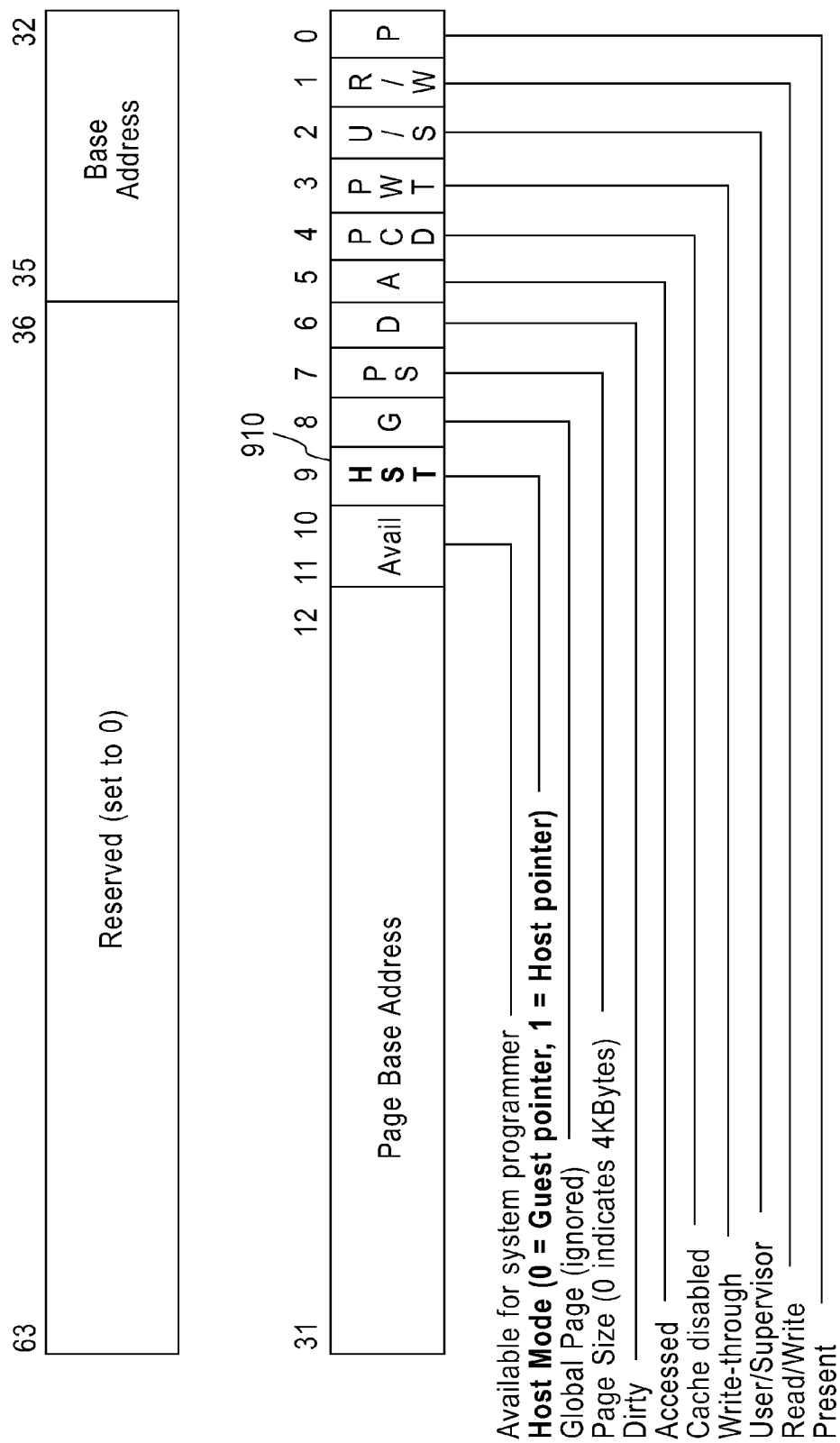
FIG. 9 is a diagram illustrating a page table entry of a cache page table, according to an exemplary embodiment of the present invention.

FIG. 9 is a diagram illustrating a page table entry of a cache page table, according to an exemplary embodiment of the present invention. The entry depicted in FIG. 9 is similar to the structure of Intel's IA-32 architecture, but it will be appreciated that the entry could be structured differently. The entry contains control flags, such as for example, present (also called valid). Additional flags may be provided. For example, a host flag 910 denotes whether the entry's page base address references a guest-physical memory address or a host-physical memory address.

Figure 10:
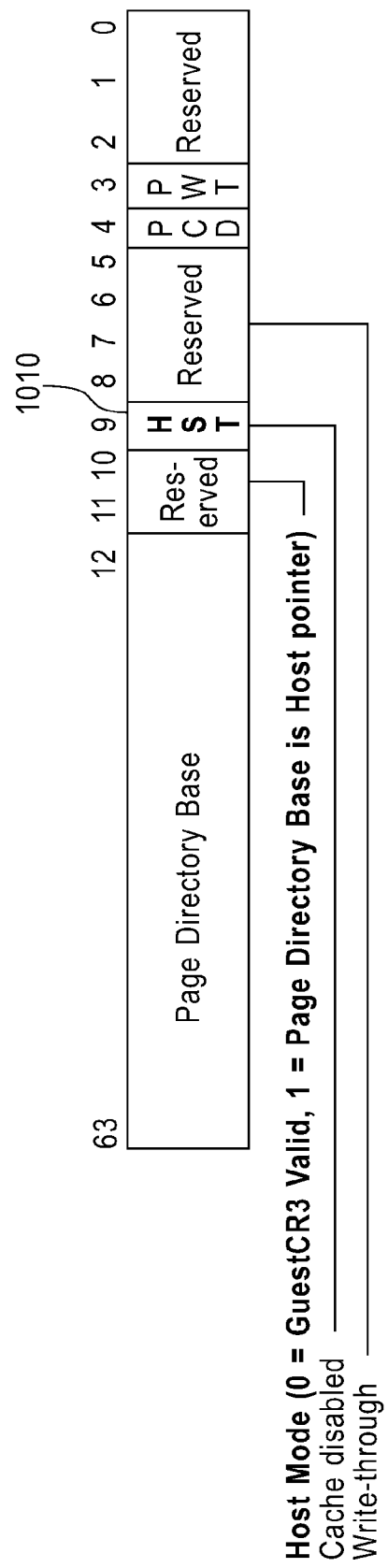
FIG. 10 is a diagram illustrating a page table pointer of a cache page table, according to an exemplary embodiment of the present invention.

FIG. 10 is a diagram illustrating a page table pointer of a cache page table, according to an exemplary embodiment of the present invention. The page table pointer depicted in FIG. 10 is similar to the structure of Intel's IA-32 architecture, but it will be appreciated that the entry could be structured differently. The entry contains control flags. In an exemplary embodiment of the present invention, the entry contains a host flag 1010, which denotes whether the entry's page base address is a valid host-physical address or whether GuestCR3 should be used a page-table base pointer.

Figure 11:
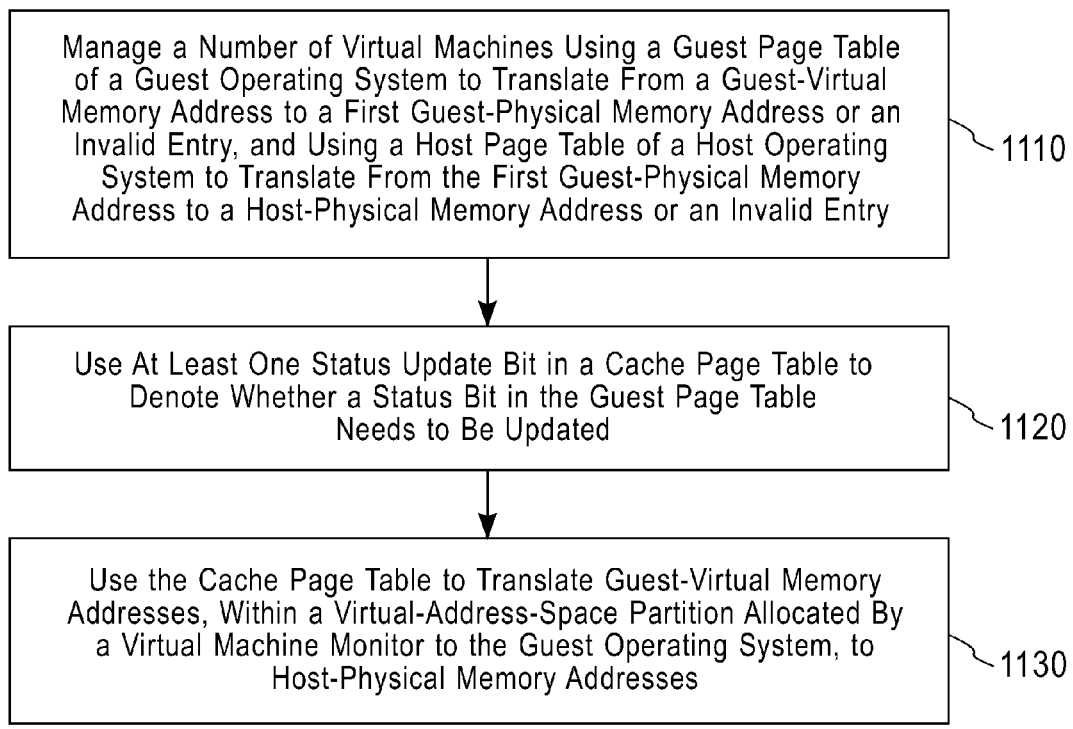
FIG. 11 is a flowchart illustrating a method of translating virtual-memory addresses to physical-memory addresses in a computer system serving as a platform for execution of a virtual machine monitor, according to an exemplary embodiment of the present invention

FIG. 11 is a flowchart illustrating a method of translating virtual-memory addresses to physical-memory addresses in a computer system serving as a platform for execution of a virtual machine monitor, according to an exemplary embodiment of the present invention. Referring to FIG. 11, in step 1110, manage a number of virtual machines using a guest page table of a guest operating system and a host page table of a host operating system. The guest page table of a guest operating system is used to translate from a guest-virtual memory address to a first guest-physical memory address or an invalid entry. The host page table of the host operating system to translate from the first guest-physical memory address to a host-physical memory address or an invalid entry.

In step 1120, use at least one status update bit in a cache page table to denote whether a status bit in the guest page table needs to be updated. The status update bit(s) may comprise, for example, an accessed bit and a dirty bit.

In an exemplary embodiment of the present invention, if the first accessed bit is determined to be clear, the first accessed bit in the cache page table is set and a second accessed bit in a guest page table of the guest operating system is set, and if the first dirty bit is determined to be clear, the first dirty bit in the cache page table is set and a second dirty bit in the guest page table is set.

In step 1130, use the cache page table to translate guest-virtual memory addresses, within a virtual-address-space partition allocated by a virtual machine monitor to the guest operating system, to host-physical memory addresses. In an exemplary embodiment of the present invention, each entry in the cache page table includes a host bit that denotes whether an address stored in the corresponding entry references a host-physical memory address or a guest-physical memory address.

In the case where the translation from guest-virtual to host-physical addresses covers a contiguous range of the host's memory space, a larger entry (commonly called a superpage) can cover the virtual-to-physical address translation. This can reduce the number of translations that the processing unit has to cache in the TLB, increasing the overall TLB coverage. To preserve the semantics of individual pages, a superpage entry in the cache page table has to mirror one or more status update bits, such as for example, accessed and dirty bits, into individual entries. Preserving the semantics of individual pages also may require that all smaller pages have identical access permissions or that the cache page table entry has more restrictive access permissions.

In an exemplary embodiment of the present invention, the status update bits comprise accessed and dirty bits. The superpage's accessed and dirty bits represent the entirety of all sub pages. Accessed and dirty bit emulation can be performed in various ways, which may differ in overhead and accuracy.

In an exemplary embodiment of the present invention, on the first access to any of the pages covered by the superpage, all accessed bits of all sub-pages are set to accessed and all the dirty bits are set. This can be implemented in software (e.g., by the hypervisor), in hardware, or any combination thereof.

In an exemplary embodiment of the present invention, an additional bit is introduced in superpage entries in the cache page table. The bit denotes whether the guest page table contains a superpage or smaller sub-pages. The processor inserts a superpage entry into the TLB, according to an exemplary embodiment of the present invention, only if accessed and dirty bits are set in the cache page table entry or if the guest superpage bit is set. Otherwise, the processing unit inserts a normal entry such that accessed and dirty bits can be updated in the right granularity. Since a single superpage entry covers multiple smaller entries in the guest page table, the processor may update accessed and dirty bits of entries in the guest page table with the status bits already set. While setting already-set accessed and dirty bits incurs a runtime overhead, the scheme preserves functional correctness.

Figure 12:
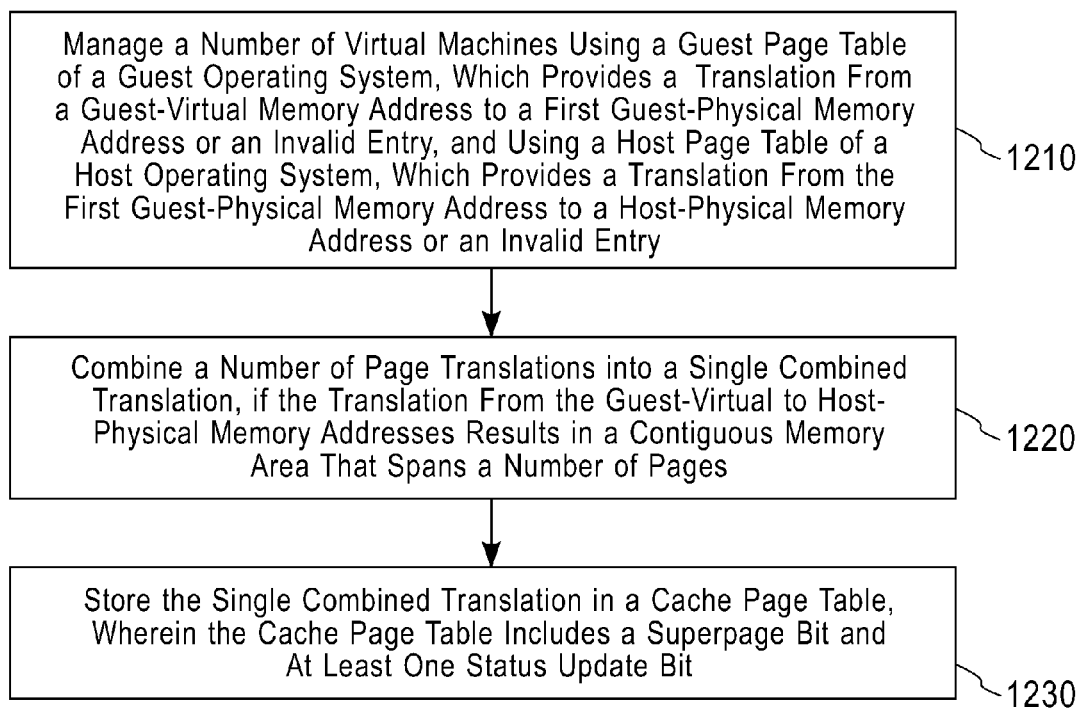
FIG. 12 is a flowchart illustrating a method of translating virtual-memory addresses to physical-memory addresses in a computer system serving as a platform for execution of a virtual machine monitor, according to an exemplary embodiment of the present invention.

FIG. 12 is a flowchart illustrating a method of translating virtual-memory addresses to physical-memory addresses in a computer system serving as a platform for execution of a virtual machine monitor, according to an exemplary embodiment of the present invention. Referring to FIG. 12, in step 1210, manage a number of virtual machines using a guest page table of a guest operating system, which provides a first translation from a guest-virtual memory address to a first guest-physical memory address or an invalid entry, and a host page table of a host operating system, which provides a second translation from the first guest-physical memory address to a host-physical memory address or an invalid entry.

In step 1220, combine a number of page translations into a single combined translations if the translation from the guest-virtual to host-physical memory addresses results in a contiguous memory area that spans a number of pages. For example, the single combined translation may be a superpage.

In step 1230, store the single combined translation in a cache page table, wherein the cache page table includes a superpage bit and at least one status update bit. The status update bit(s) may comprise an accessed bit and a dirty bit. In an exemplary embodiment of the present invention, if the at least one status update bit is clear, the processor raises an exception.

Each entry in the cache page table may include a host bit that denotes whether an address stored in the corresponding entry references a host-physical memory address or a guest-physical memory address. It is to be understood that the host bit may be implemented by a counter.

Although exemplary embodiments of the present invention have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing exemplary embodiments may be made without departing from the scope of the invention as defined by the appended claims, with equivalents of the claims to be included therein.

What is claimed is:

1. A program storage device readable by machine, tangibly embodying a program of instructions executable by the machine to perform method steps for caching of page translations for virtual machines, the method comprising: managing a plurality of virtual machines having respective guest operating systems and respective guest page tables, wherein a guest page table of a first guest operating system provides a first translation from a first guest-virtual memory address of a translation look-aside buffer miss to a first guest-physical memory address in the guest page table, and a host page table of a host operating system, which provides a second translation from the first guest-physical memory address in the guest page table to a host-physical memory address; and
managing a cache page table for each of the virtual machines, the cache page tables storing a plurality of page base addresses, wherein a page base address of the plurality of page base addresses provides a third translation from the first guest-virtual memory address to the host-physical memory address indicated by a host bit associated with the page base address indicating that the page base address denotes a host-physical memory address, and wherein each page base address is associated with a respective host bit indicating whether the respective page base address denotes a guest-physical memory address or a host-physical memory address.

2. The program storage device of claim 1, wherein the cache page table is realized using a cache page table pointer to point to the start of the page table.

3. The program storage device of claim 1, wherein a third translation of another page base address of the plurality of page base addresses is a direct translation from the guest-virtual memory address to the host-physical memory address or an invalid entry, or an indirect translation using the guest page table and the host page table.

4. The program storage device of claim 3, wherein the indirect translation comprises:
reading one or more entries from the guest page table or a processor register; and
translating each entry, if valid, from guest physical memory to host physical memory using the host page table, or if not valid, raise an exception.

5. A method of translating virtual-memory addresses to physical-memory addresses in a computer system serving as a platform for execution of a virtual machine monitor, the method comprising:
managing a plurality of virtual machines using a guest page table of a guest operating system, which provides a first translation from a guest-virtual memory address of a translation look-aside buffer miss to a first guest-physical memory address, and a host page table of a host operating system, which provides a second translation from the first guest-physical memory address in the guest page table to a host-physical memory address of a next level guest page table;
determining that a result of the first translation and the second translation from the guest-virtual to host-physical memory addresses covers a contiguous memory area that spans a plurality of pages of one host memory space;
combining the result of the first translation and the second translation in a single combined translation from the guest-virtual memory address to the host-physical memory address;
inserting the single combined translation as a superpage entry in a first cache page table; and
managing a cache page table for each of the virtual machines, the first cache page table storing the superpage entry, a superpage bit indicating that the superpage entry is stored and at least one status update bit associated with all of the plurality of pages covered by the superpage entry.

6. The method of claim 5, wherein when the at least one status update bit is clear, the processor raises an exception.

7. The method of claim 5, wherein the at least one status update bit comprises an accessed bit and a dirty bit.

* * * * *